(12) United States Patent  (10) Patent No.: US 8,160,300 B2
Ogasawara  (45) Date of Patent: Apr. 17, 2012

(54) PEDESTRIAN DETECTING APPARATUS

(75) Inventor: Toyokazu Ogasawara, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 981 days.

(21) Appl. No.: 12/136,466

(22) Filed: Jun. 10, 2008

(65) Prior Publication Data

US 2008/0310678 A1  Dec. 18, 2008

(30) Foreign Application Priority Data

Jun. 12, 2007  (JP) ................................ 2007-155634

(51) Int. Cl.
*G06K 9/00* (2006.01)
*G08G 1/07* (2006.01)
*G08G 1/095* (2006.01)

(52) U.S. Cl. .......................... 382/104; 340/925; 340/944

(58) Field of Classification Search .................. 382/103, 382/107, 236; 348/148, 169, 149, 170, 171, 348/172, 208.14; 340/461, 925, 944; 701/70, 701/200, 211; 296/187.04
See application file for complete search history.

(56) References Cited

U.S. PATENT DOCUMENTS 7,233,233 B2 * 6/2007 Taniguchi et al. ............ 340/435
7,498,972 B2 * 3/2009 Tanaka ............................ 342/70
7,598,848 B2 * 10/2009 Takagi et al. .................. 340/436

FOREIGN PATENT DOCUMENTS

JP  2004-145660  5/2004
JP  2004-298285  10/2004

* cited by examiner

*Primary Examiner* — Abolfazl Tabatabai
(74) *Attorney, Agent, or Firm* — Smith, Gambrell & Russell, LLP

(57) ABSTRACT

A first pedestrian judging unit judges, on the basis of the size and motion state of a target three-dimensional object, whether the object is a pedestrian. A second pedestrian judging unit judges, on the basis of shape data on the object, whether the object is a pedestrian. A pedestrian judging unit finally determines that the object is a pedestrian when both the first and second pedestrian judging units judge the object as a pedestrian, when the second pedestrian judging unit judges the object as a pedestrian, when the first pedestrian judging unit judges the object as a pedestrian and a result of this judgment is held for a preset period, or when the first pedestrian judging unit judges the object as a pedestrian in a current judgment operation and the second pedestrian judging unit judged the object as a pedestrian in the previous judging operation.

6 Claims, 2 Drawing Sheets

PEDESTRIAN DETECTING APPARATUS

CROSS-REFERENCE TO RELATED APPLICATIONS

The disclosure of Japanese Patent Application No. 2007-155634 filed on Jun. 12, 2007 including the specification, drawings, and abstract is incorporated herein by reference in its entirety.

BACKGROUND OF THE INVENTION

1. Field of the Invention

The present invention relates to a pedestrian detecting apparatus that precisely detects a pedestrian.

2. Description of the Related Art

In recent years, various environment recognizing and sensing technologies have been developed for applications to vehicle drive assist systems. Above all, detection of pedestrians has attracted attention. A collision between a pedestrian and a vehicle is frequently caused by the delay of the driver in recognizing the pedestrian, and this collision heavily damages the pedestrian. Accordingly, it is necessary to detect the pedestrian as quickly and precisely as possible.

For example, Japanese Unexamined Patent Application Publication No. 2004-298285 discloses a technique of detecting the walking condition of a pedestrian. In this technique, the top of the head of a pedestrian is detected in a two-dimensional image, and a trajectory of the top of the head on the time axis is obtained from a temporal transition of the position of the top in the image. By subjecting the trajectory to frequency analysis, a frequency spectrum of the motion of the top of the head is obtained. On the basis of the frequency spectrum, a fundamental frequency of the walking motion is specified and compared with a predetermined walking condition model, thus detecting the walking condition of the pedestrian.

Unfortunately, in the technique of detecting the condition of the pedestrian or detecting the pedestrian by comparison with the prestored model, as disclosed in the above-described publication, it is necessary to learn more models beforehand in order to improve the detection accuracy. Moreover, the amount of data to be processed for detection increases, and this leads to detection delay.

SUMMARY OF THE INVENTION

The present invention has been made in view of the above-described circumstances, and an object of the invention is to provide a pedestrian detecting apparatus that can quickly and precisely detect a pedestrian without increasing the amount of data to be learned beforehand.

A pedestrian detecting apparatus according to a first aspect of the present invention includes forward three-dimensional object recognizing means for recognizing a forward three-dimensional object; first pedestrian judging means for judging, on the basis of a size and a motion state of the recognized forward three-dimensional object, whether the forward three-dimensional object is a pedestrian; second pedestrian judging means for judging, on the basis of shape data on the recognized forward three-dimensional object, whether the forward three-dimensional object is the pedestrian; and final pedestrian judging means for finally judging, on the basis of a result of judgment by the first pedestrian judging means and a result of judgment by the second pedestrian judging means, whether the recognized forward three-dimensional object is the pedestrian.

A second aspect of the present invention according to the first aspect further includes crossing-pedestrian judging means for judging, on the basis of a front-rear direction speed and a lateral direction speed of the recognized forward three-dimensional object, whether the recognized forward three-dimensional object is a crossing pedestrian crossing in front of a vehicle.

A third aspect of the present invention according to the first aspect is that the final pedestrian judging means finally determines that the forward three-dimensional object is the pedestrian when both the first pedestrian judging means and the second pedestrian judging means judge the forward three-dimensional object as the pedestrian.

A fourth aspect of the present invention according to the first aspect is that the final pedestrian judging means finally determines that the forward three-dimensional object is the pedestrian when the second pedestrian judging means judges the forward three-dimensional object as the pedestrian.

A fifth aspect of the present invention according to the first aspect is that the final pedestrian judging means finally determines that the forward three-dimensional object is the pedestrian when the first pedestrian judging means judges the forward three-dimensional object as the pedestrian and a result of the judgment by the first pedestrian judging means is held for a preset period.

A sixth aspect of the present invention according to the first aspect is that the final pedestrian judging means finally determines that the forward three-dimensional object is the pedestrian when the first pedestrian judging means judges the forward three-dimensional object as the pedestrian in a current judging operation and the second pedestrian judging means judged the forward three-dimensional object as the pedestrian in the previous judging operation.

A seventh aspect of the present invention includes three-dimensional object recognizing unit configured to recognize a three-dimensional object, first pedestrian judging unit configured to judge, on the basis of a size and a movement speed of the recognized three-dimensional object, whether the three-dimensional object is a pedestrian, second pedestrian judging unit configured to judge, on the basis of shape data on the recognized three-dimensional object, whether the three-dimensional object is the pedestrian; and final pedestrian judging unit configured to finally determine, on the basis of a result of judgment by the first pedestrian judging unit and a result of judgment by the second pedestrian judging unit, whether the recognized forward three-dimensional object is the pedestrian.

The pedestrian detecting apparatus according to the present inventions can quickly and precisely detect a pedestrian without increasing the amount of data to be learned beforehand.

DESCRIPTION OF THE PREFERRED EMBODIMENT

An embodiment of the present invention will be described below with reference to the drawings.

Figure 1:
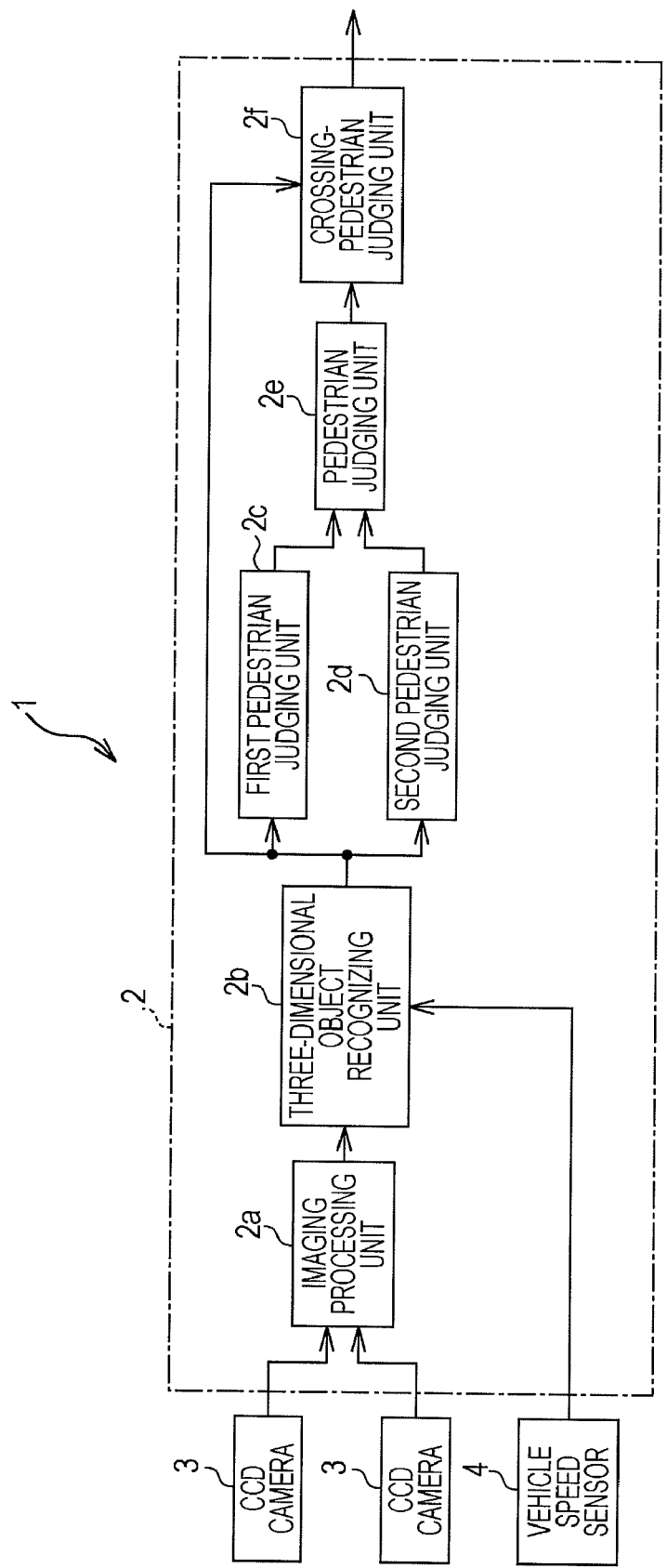
FIG. 1 is a functional block diagram showing the configuration of a pedestrian detecting apparatus according to an embodiment of the present invention.
Figure 2:
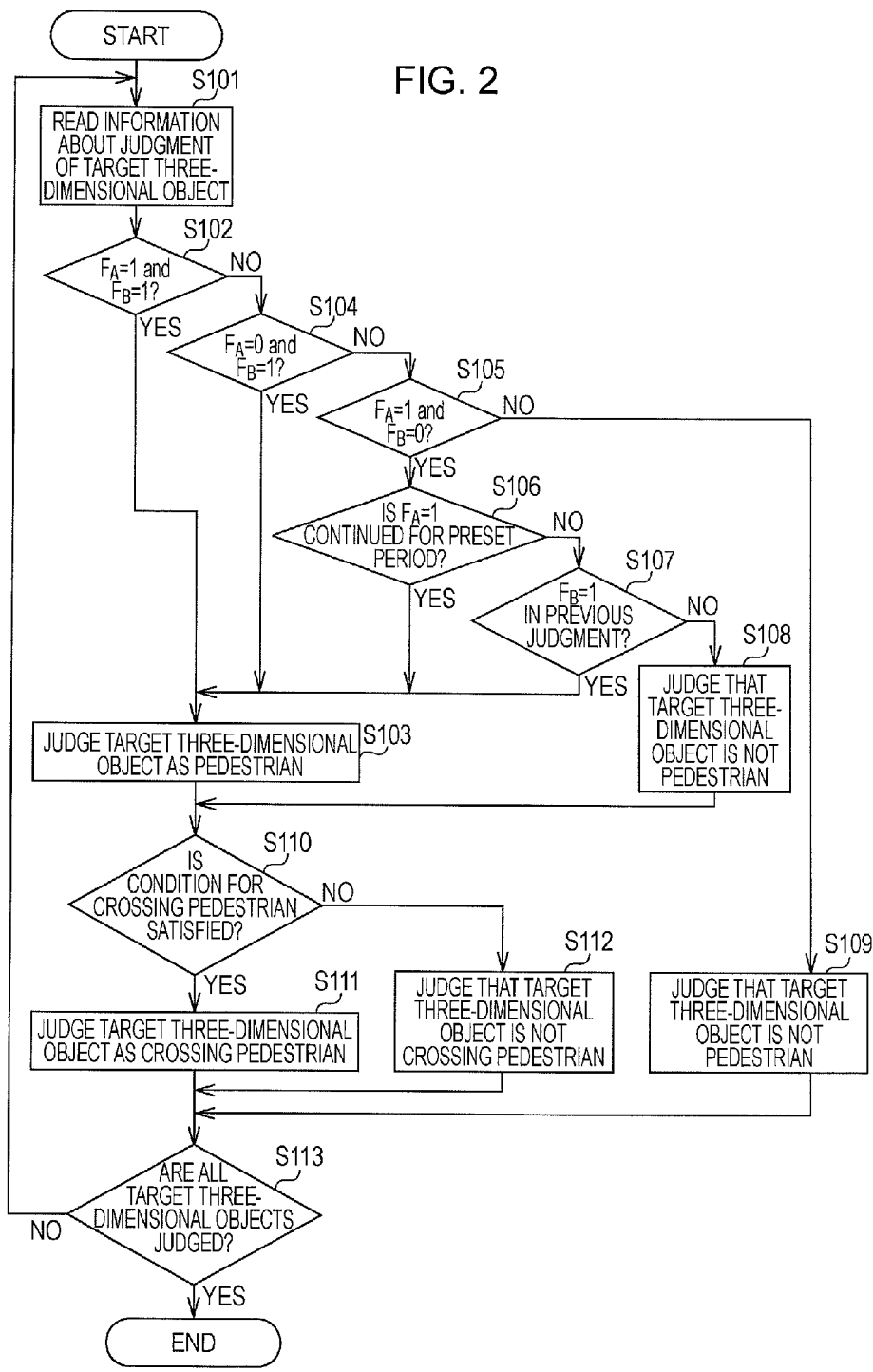
FIG. 2 is a flowchart showing a pedestrian detection program.

FIGS. 1 and 2 show an embodiment of the present invention. FIG. 1 is a functional block diagram showing the configuration of a pedestrian detecting apparatus according to the embodiment, and FIG. 2 is a flowchart showing a pedestrian detection program.

Referring to FIG. 1, a pedestrian detecting apparatus 1 is mounted in a vehicle. Stereo optical systems and a vehicle speed sensor 4 that are mounted in the vehicle are connected to a control section 2 in the pedestrian detecting apparatus 1, and input picture signals and a vehicle-speed signal to the control section 2.

The stereo optical systems are formed by, for example, a pair of CCD cameras 3 each using a solid-state image sensor such as a charge coupled device (CCD). The CCD cameras 3 are mounted in the front of a ceiling in the vehicle interior so as to be arranged with a predetermined space therebetween. The CCD cameras 3 take stereo images of an outside object from different viewpoints.

The control section 2 includes microcomputers and peripheral circuits, that is, the control section 2 mainly includes an image processing unit 2a, a three-dimensional object recognizing unit 2b, a first pedestrian judging unit 2c, a second pedestrian judging unit 2d, a pedestrian judging unit 2e, and a crossing-pedestrian judging unit 2f.

Image signals are input from the CCD cameras 3 to the image processing unit 2a. The image processing unit 2a processes a pair of stereo images of an environment of the vehicle in the traveling direction that are taken by the CCD cameras 3, and obtains distance information from the amount of misalignment between the corresponding positions in the images according to the principle of triangulation. On the basis of the distance information, the image processing unit 2a generates a distance image indicating a three-dimensional distance distribution, and outputs data on the distance image to the three-dimensional object recognizing unit 2b.

The three-dimensional object recognizing unit 2b receives the image data on the distance image from the image processing unit 2a, and vehicle speed data from the vehicle speed sensor 4. The three-dimensional object recognizing unit 2b subjects the image data to well-known grouping, and compares the image data with three-dimensional road shape data and three-dimensional object data that are stored beforehand, thus extracting white-line data, side-wall data on guardrails and curbs extending along the road, and data on three-dimensional objects existing on the forward road.

Particularly for a three-dimensional object, not only data on the width, height, and outline, but also data on the distance to the three-dimensional object and a temporal change in the distance (relative speed with respect to the vehicle) are obtained as three-dimensional object data. By adding the front-rear direction speed of the three-dimensional object relative to the vehicle and the speed of the vehicle, the front-rear direction speed of the three-dimensional object is calculated. Moreover, the lateral-direction speed of the three-dimensional object is calculated by finding the lateral-direction speed of the three-dimensional object relative to the vehicle. The front-rear direction speed and lateral-direction speed of the three-dimensional object are stored as three-dimensional object data. The three-dimensional object data thus extracted is output to the first pedestrian judging unit 2c, the second pedestrian judging unit 2d, and the crossing-pedestrian judging unit 2f. In other words, in this embodiment, the CCD cameras 3, the vehicle speed sensor 4, the image processing unit 2a, and the three-dimensional object recognizing unit 2b constitute a forward three-dimensional object recognizing means.

The three-dimensional object data is input from the three-dimensional object recognizing unit 2b to the first pedestrian judging unit 2c. For example, when a three-dimensional object has a width of 30 cm to 1 m, a height of 2 m or less, a front-rear direction speed of 20 km/h or less, and a lateral-direction speed of 20 km/h or less, the first pedestrian judging unit 2c judges the three-dimensional object as a pedestrian. In other words, the first pedestrian judging unit 2c serves as a first pedestrian judging means. The result of judgment by the first pedestrian judging unit 2c is output to the pedestrian judging unit 2e.

The three-dimensional object data is also input from the three-dimensional object recognizing unit 2b to the second pedestrian judging unit 2d. The second pedestrian judging unit 2d compares a part of the three-dimensional object data concerning the outline peculiar to the pedestrian (for example, a line from the head to the shoulder) with a plurality of prestored leaned data, and thereby judges whether the three-dimensional object is a pedestrian. The second pedestrian judging unit 2d may make judgment, for example, by the method disclosed in Japanese Unexamined Patent Application Publication No. 2004-145660 assigned to the present applicant. That is, shape data on a three-dimensional object is extracted by binarizing image data from a visualization camera, and a motion pattern of the three-dimensional object is detected on the basis of a temporal change in the shape data. By comparing the motion pattern of the three-dimensional object with a motion pattern learned in a neural network, the three-dimensional object is identified and a pedestrian is detected. In other words, the second pedestrian judging unit 2d serves as a second pedestrian judging means. The result of judgment by the second pedestrian judging unit 2d is output to the pedestrian judging unit 2e.

The pedestrian judging unit 2e receives the pedestrian judgment results from the first pedestrian judging unit 2c and the second pedestrian judging unit 2d, and makes a final pedestrian judgment according to a pedestrian detection program that will be described below. More specifically, the pedestrian judging unit 2e finally determines that three-dimensional objects satisfying any of the following conditions are pedestrians:

(1) a three-dimensional object that is judged as a pedestrian by both the first pedestrian judging unit 2c and the second pedestrian judging unit 2d;

(2) a three-dimensional object that is judged as a pedestrian by the second pedestrian judging unit 2d;

(3) a three-dimensional object that is continuously judged as a pedestrian by the first pedestrian judging unit 2c for a preset period (for example, for 1 sec or for a period corresponding to several frames); and (4) a three-dimensional object that is judged as a pedestrian by the first pedestrian judging unit 2c in the current judging operation and was judged as a pedestrian by the second pedestrian judging unit 2d in the previous judging operation.

A three-dimensional object that does not satisfy any of the above-described four conditions is judged not as a pedestrian. In other words, the pedestrian judging unit 2e serves as a final pedestrian judging means. The result of judgment by the pedestrian judging unit 2e is output to the crossing-pedestrian judging unit 2f.

The crossing-pedestrian judging unit 2f receives the final pedestrian judgment result from the pedestrian judging unit 2e and the three-dimensional object data from the three-dimensional object recognizing unit 2b. Of three-dimensional objects judged as pedestrians by at least one of the first pedestrian judging unit 2c and the second pedestrian judging unit 2d, a three-dimensional object having a front-rear direction speed of 20 km/h or less and a lateral direction speed of 20 to 30 km/h is judged as a crossing pedestrian. In other words, the crossing-pedestrian judging unit 2f serves as a crossing-pedestrian judging means. The result of judgment by the crossing-pedestrian judging unit 2*f* is output from the control section 2 together with the result of final pedestrian judgment by the pedestrian judging unit 2*e*.

A pedestrian detection program executed by the pedestrian judging unit 2*e* and the crossing-pedestrian judging unit 2*f* will now be described with reference to FIG. 2 serving as a flowchart.

First, in Step (hereinafter abbreviated as "S") 101, results of judgment of a three-dimensional object (target three-dimensional object) made by the first pedestrian judging unit 2*c* and the second pedestrian judging unit 2*d* are read. In this embodiment, as the judgment results, a first judgment flag $F_A$ is set at "1" when the first pedestrian judging unit 2*c* judges the target three-dimensional object as a pedestrian, and set at "0" when the first pedestrian judging unit 2*c* judges that the target three-dimensional object is not a pedestrian. Similarly, a second judgment flag $F_B$ is set at "1" when the second pedestrian judging unit 2*d* judges the target three-dimensional object as a pedestrian, and set at "0" when the second pedestrian judging unit 2*d* judges that the target three-dimensional object is not a pedestrian. Steps S101 to S109 are performed by the pedestrian judging unit 2*e*, and S110 to S112 are performed by the crossing-pedestrian judging unit 2*f*.

In S102, it is determined whether $F_A$=1 and $F_B$=1 (that is, whether both the first pedestrian judging unit 2*c* and the second pedestrian judging unit 2*d* judge the target three-dimensional object as a pedestrian). When $F_A$=1 and $F_B$=1, it is finally determined in S103 that the target three-dimensional object is a pedestrian.

In contrast, when it is not determined in S102 that $F_A$=1 and $F_B$=1, it is determined in S104 whether $F_A$=0 and $F_B$=1 (that is, whether the first pedestrian judging unit 2*c* judges that the target three-dimensional object is not a pedestrian, but the second pedestrian judging unit 2*d* judges the target three-dimensional object as a pedestrian). When $F_A$=0 and $F_B$=1, it is finally determined in Step S103 that the target three-dimensional object is a pedestrian. In other words, pedestrian judgment by the second pedestrian judging unit 2*d* takes some time, but precisely judges the pedestrian on the basis of previously learned data. The result of this judgment by the second pedestrian judging unit 2*d* is adopted preferentially.

When it is not determined in S104 that $F_A$=0 and $F_B$=1, it is determined in S105 whether $F_A$=1 and $F_B$=0 (that is, whether the first pedestrian judging unit 2*c* judges the target three-dimensional object as a pedestrian, but the second pedestrian judging unit 2*d* judges that the target three-dimensional object is not a pedestrian). When $F_A$=1 and $F_B$=0, it is further determined in S106 whether the result of determination that $F_A$=1 is held for a preset period (for example, for 1 sec or for a period corresponding to several frames).

When it is determined in S106 that the result of determination that $F_A$=1 is held for the preset period, it is finally determined in S103 that the target three-dimensional object is a pedestrian. In other words, even if the second pedestrian judging unit 2*d* judges that the target three-dimensional object is not a pedestrian, when the first pedestrian judging unit 2*c* continuously judges the target three-dimensional object as a pedestrian for the preset period, it is determined that the target three-dimensional object is a pedestrian.

When it is determined in S106 that the result of determination that $F_A$=1 is not held for the preset period, it is determined in S107 whether $F_B$=1 in the previous judgment operation (that is, whether the second pedestrian judging unit 2*d* judged the target three-dimensional object as a pedestrian). When it is determined in S107 that $F_B$=1 in the previous judgment operation, it is finally determined in S103 that the target three-dimensional object is a pedestrian. In other words, even if the result of determination that $F_A$=1 is not held for the preset period, when the second pedestrian judging unit 2*d* having high reliability previously judged the target three-dimensional object as a pedestrian, the target three-dimensional object is highly likely to be a pedestrian. Therefore, it is finally determined that the target three-dimensional object is a pedestrian.

When it is determined in S107 that $F_B$ was not 1 in the previous judgment operation, it is determined in S108 that the target three-dimensional object is not a pedestrian.

In contrast, when the condition that $F_A$=1 and $F_B$=0 is not satisfied (that is, $F_A$=0 and $F_B$=0 and both the first and second pedestrian judging units 2*c* and 2*d* judge the target three-dimensional object is not a pedestrian) in S105, it is determined in S109 that the target three-dimensional object is not a pedestrian, and the program proceeds to S113.

After it is determined in S103 that the target three-dimensional object is a pedestrian or it is determined in S108 that the target three-dimensional object is not a pedestrian, it is determined in S110 whether the condition for a crossing pedestrian (the front-rear direction speed is 20 km/h or less and the lateral direction speed is 20 to 30 km/h) is satisfied.

In this case, judgment is also made for the target three-dimensional object that was judged not as a pedestrian in S108. Since it is necessary to pay special attention to a three-dimensional object crossing in front of the vehicle, when at least one of the first and second pedestrian judging units 2*c* and 2*d* judges the target three-dimensional object as a pedestrian, the target three-dimensional object is subjected to judgment for a crossing pedestrian. The result of this judgment is adopted preferentially.

When it is determined in S110 that the condition for a crossing pedestrian is satisfied, it is determined in S111 that the target three-dimensional object is a crossing pedestrian, and the program proceeds to S113. When the condition for a crossing pedestrian is not satisfied, it is determined in S112 that the target three-dimensional object is not a crossing pedestrian, and the program proceeds to S113.

In S113, it is determined whether judgment for all target three-dimensional objects is completed. When the judgment is not completed, the steps are repeated from S101 for the next target three-dimensional object. When the judgment is completed, the program is escaped.

In this way, according to the embodiment of the present invention, the first pedestrian judging unit 2*c* judges, on the basis of the size and motion state of a target three-dimensional object, whether the target three-dimensional object is a pedestrian. The second pedestrian judging unit 2*d* judges, on the basis of shape data on the target three-dimensional object, whether the target three-dimensional object is a pedestrian. The pedestrian judging unit 2*e* finally determines, on the basis of the judgment results of the first and second pedestrian judging units 2*c* and 2*d*, whether the target three-dimensional object is a pedestrian. Therefore, it is possible to quickly and precisely detect a pedestrian without increasing the amount of data to be learned beforehand.

The crossing-pedestrian judging unit 2*f* judges that a three-dimensional object having a front-rear direction speed of 20 km/h or less and a lateral direction speed of 20 to 30 km/h, of three-dimensional objects that are judged as pedestrians by at least one of the first and second pedestrian judging unit 2*c* and 2*d*, is a crossing pedestrian. Therefore, it is possible to preferentially and quickly detect a pedestrian to which the closest attention should be paid from the vehicle.

While the forward three-dimensional object is recognized on the basis of images taken by the CCD cameras 3 in the above-described embodiment, it may be detected by, for example, a monocular camera or a millimeter-wave radar.

What is claimed is:

1. A pedestrian detecting apparatus comprising:
   forward three-dimensional object recognizing means for recognizing a forward three-dimensional object;
   first pedestrian judging means for judging, on the basis of a size and a motion state of the recognized forward three-dimensional object, whether the forward three-dimensional object is a pedestrian;
   second pedestrian judging means for judging, on the basis of shape data on the recognized forward three-dimensional object, whether the forward three-dimensional object is the pedestrian;
   final pedestrian judging means for finally determining, on the basis of a result of judgment by the first pedestrian judging means and a result of judgment by the second pedestrian judging means, whether the recognized forward three-dimensional object is the pedestrian; and
   crossing-pedestrian judging means for judging, on the basis of a front-rear direction speed and a lateral direction speed of the recognized forward three-dimensional object, whether the recognized forward three-dimensional object is a crossing pedestrian crossing in front of a vehicle.

2. The pedestrian detecting apparatus according to claim 1, wherein the final pedestrian judging means finally determines that the forward three-dimensional object is the pedestrian when both the first pedestrian judging means and the second pedestrian judging means judge the forward three-dimensional object as the pedestrian.

3. The pedestrian detecting apparatus according to claim 1, wherein the final pedestrian judging means finally determines that the forward three-dimensional object is the pedestrian when the second pedestrian judging means judges the forward three-dimensional object as the pedestrian.

4. The pedestrian detecting apparatus according to claim 1, wherein the final pedestrian judging means finally determines that the forward three-dimensional object is the pedestrian when the first pedestrian judging means judges the forward three-dimensional object as the pedestrian and a result of the judgment by the first pedestrian judging means is held for a preset period.

5. The pedestrian detecting apparatus according to claim 1, wherein the final pedestrian judging means finally determines that the forward three-dimensional object is the pedestrian when the first pedestrian judging means judges the forward three-dimensional object as the pedestrian in a current judging operation and the second pedestrian judging means judged the forward three-dimensional object as the pedestrian in the previous judging operation.

6. A pedestrian detecting apparatus comprising:
   forward three-dimensional object recognizing unit configured to recognize a three-dimensional object;
   first pedestrian judging unit configured to judge, on the basis of a size and a movement speed of the recognized three-dimensional object, whether the three-dimensional object is a pedestrian;
   second pedestrian judging unit configured to judge, on the basis of shape data on the recognized three-dimensional object, whether the three-dimensional object is the pedestrian;
   final pedestrian judging unit configured to finally determine, on the basis of a result of judgment by the first pedestrian judging unit and a result of judgment by the second pedestrian judging unit, whether the recognized forward three-dimensional object is the pedestrian; and
   crossing-pedestrian judging unit configured to judge, on the basis of a front-rear direction speed of the recognized forward three-dimensional object, whether the recognized forward three-dimensional object is a crossing-pedestrian crossing in front of a vehicle.

* * * * *